(12) United States Patent
Ubhi

(10) Patent No.: US 12,454,040 B2
(45) Date of Patent: Oct. 28, 2025

(54) BOTTOM BRACKET TOOL

(71) Applicant: Jaswant Ubhi, Montreal (CA)

(72) Inventor: Jaswant Ubhi, Montreal (CA)

( * ) Notice: Subject to any disclaimer, the term of this patent is extended or adjusted under 35 U.S.C. 154(b) by 604 days.

(21) Appl. No.: 17/634,777

(22) PCT Filed: Aug. 14, 2020

(86) PCT No.: PCT/CA2020/051118
§ 371 (c)(1),
(2) Date: Feb. 11, 2022

(87) PCT Pub. No.: WO2021/026664
PCT Pub. Date: Feb. 18, 2021

(65) Prior Publication Data
US 2022/0281087 A1 Sep. 8, 2022

Related U.S. Application Data

(60) Provisional application No. 62/886,566, filed on Aug. 14, 2019.

(51) Int. Cl.
*B25B 27/00* (2006.01)
*B25B 27/14* (2006.01)

(52) U.S. Cl.
CPC .......... *B25B 27/0071* (2013.01); *B25B 27/14* (2013.01)

(58) Field of Classification Search
CPC .............................. B25B 27/0071; B25B 27/14
See application file for complete search history.

(56) References Cited

U.S. PATENT DOCUMENTS

| 5,243,879 | A | 9/1993 | Nagano | |
| 7,073,996 | B1 * | 7/2006 | Hernandez | B62M 3/003 74/594.1 |
| 7,856,903 | B2 | 12/2010 | Yamanaka et al. | |

OTHER PUBLICATIONS

YouTube Video "High Precision Carbon Steel Galvanized Hollow Threaded Bolt/Hex For Tube Fittings" (https://www.youtube.com/watch?v=hAQFb_KBBSQ). May 7, 2019 (Year: 2019).*
International Search Report and Written Opinion, PCT/CA2020/051118, Oct. 22, 2020.

* cited by examiner

*Primary Examiner* — Nirvana Deonauth
(74) *Attorney, Agent, or Firm* — NORTON ROSE FULBRIGHT CANADA LLP

(57) ABSTRACT

A bottom bracket tool is disclosed. The bottom bracket tool has a rim body having a plurality of teeth defined at an outer periphery thereof, the teeth configured for cooperating with a chain of a chain whip tool. The bottom bracket tool has a connector portion defining a coupling of the bottom bracket tool adapted to engage a correspondingly shaped coupling portion of the bottom bracket assembly. A method of removing a bottom bracket assembly from a bicycle frame is disclosed. The method comprises registering correspondingly shaped coupling portions of the bottom bracket assembly and of a bottom bracket tool, mounting a chain whip tool on teeth defined at an outer periphery of a rim body of the bottom bracket tool, and generating a torque on the bottom bracket tool mounted to the bottom bracket assembly via the chain whip tool.

17 Claims, 7 Drawing Sheets

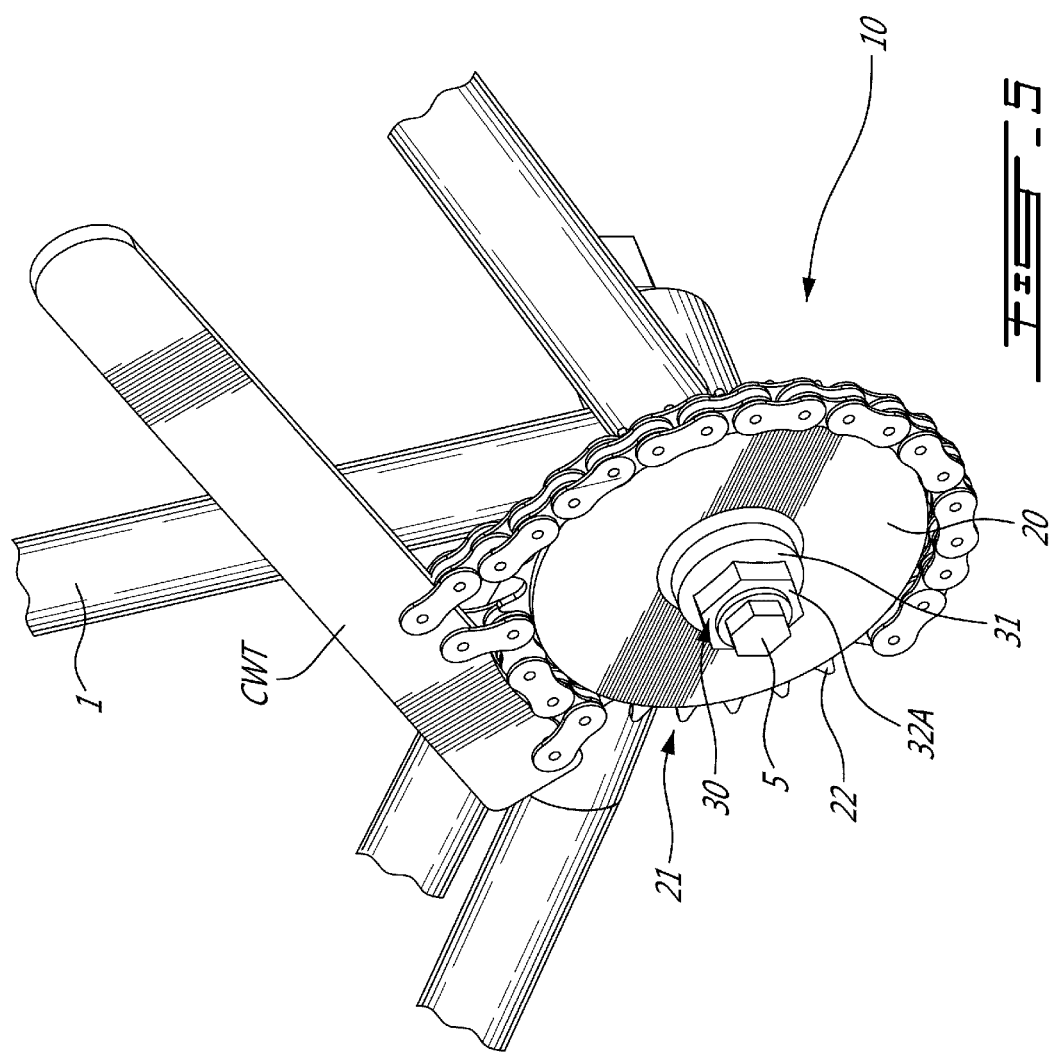

BOTTOM BRACKET TOOL

CROSS-REFERENCE TO RELATED APPLICATIONS

This application claims priority from U.S. Provisional Patent Application Ser. No. 62/886,566 filed on Aug. 14, 2019, the entire content of which is incorporated herein by reference.

TECHNICAL FIELD

The application relates generally to bicycle tools and, more particularly, to bottom bracket tools.

BACKGROUND OF THE ART

Bicycle maintenance and more particularly removal and/or replacement of bottom bracket assemblies mounted on bicycle frames may be difficult. Some bottom bracket assemblies, or parts thereof, may be screwed to the bottom bracket shell, also known as bottom bracket. The threading may usually be fine, and the exposure of the bottom bracket to water, dirt, mud, may seize up the threading engagement. Accordingly, occasionally, substantial manually applied torque may be required to unscrew the bottom bracket assemblies, or parts thereof, from the bottom bracket shell. While different tools, adapters and/or plugs may have been developed over the decades by tooling specialists, there is still a need for facilitating removal and/or installation of bottom bracket assemblies to bicycle frames.

SUMMARY

In accordance with a first aspect, there is provided a bottom bracket tool for a bottom bracket assembly, the bottom bracket tool comprising: a rim body having a plurality of teeth defined at an outer periphery thereof, the teeth configured for cooperating with a chain of a chain whip tool; and a connector portion connected to or forming part of the rim body, the connector portion including a coupling of the bottom bracket tool, the coupling adapted to engage a correspondingly shaped coupling portion of the bottom bracket assembly.

Further in accordance with the first aspect, a distance between an axial end face of the coupling adapted to face the correspondingly shaped coupling portion of the bottom bracket assembly and an axial plane of the rim body coplanar with the teeth is less than $\frac{1}{2} \pm \frac{1}{16}$ inch, for example.

Further in accordance with the first aspect, the connector portion projects from at least one side of the rim body, for example.

Further in accordance with the first aspect, the connector portion defines an opening at an axial end face thereof adapted to receive a spindle of the bottom bracket assembly when the bottom bracket tool is mounted to the bottom bracket assembly, for example.

Further in accordance with the first aspect, the rim body and the connector portion are concentrically connected to one another along a common axis, for example.

Further in accordance with the first aspect, the coupling is defined in a side surface of the rim body, for example.

Further in accordance with the first aspect, the coupling includes splines, for example.

Further in accordance with the first aspect, the splines mentioned above are defined in an outer periphery of the coupling, the splines extending from an axial end face of the coupling, for example.

Further in accordance with the first aspect, the coupling defines a receptacle having a pair of opposite spaced apart walls adapted to engage corresponding flat surfaces of a flanged cup of the bottom bracket assembly, for example.

Further in accordance with the first aspect, the receptacle is a channel extending along a substantial portion of a maximum diameter of the rim body, for example.

Further in accordance with the first aspect, the rim body defines a disc, the teeth defined on a full circumference of the disc, for example.

Further in accordance with the first aspect, the rim body has a maximum dimension in an axial plane of the rim body coplanar with the teeth, the maximum dimension being 4.5 inches+2/−1 inches, for example.

Further in accordance with the first aspect, the connector portion includes a hollowed connection sleeve adapted to receive an end of a spindle of the bottom bracket when the bottom bracket tool is engaged to the bottom bracket, for example.

Further in accordance with the first aspect, the hollowed connection sleeve mentioned above defines a hole at an axial end of the connector portion, surrounded by an abutment surface, the hole adapted to receive a fastener securable to the spindle, for example.

Further in accordance with the first aspect, the hollowed connection sleeve mentioned above includes flat surfaces at a periphery thereof, for example.

Further in accordance with the first aspect, the hollowed connection sleeve mentioned above has an hexagonal portion, for example.

Further in accordance with the first aspect, the coupling is a first coupling of the bottom bracket tool on a first side of the rim body, the connector portion including a second coupling on a second opposite side of the rim body, the second coupling adapted to engage a correspondingly shaped coupling portion of the bottom bracket assembly that is different from that of the first coupling, for example.

In accordance with a second aspect, there is provided a bottom bracket tool for a bottom bracket assembly, the bottom bracket assembly including a spindle, the bottom bracket tool comprising: a rim body having a plurality of teeth defined at an outer periphery thereof, the teeth configured for cooperating with a chain of a chain whip tool; and a connector portion projecting from the rim body, the connector portion including a hollowed connection sleeve defining an end of the connector portion, the hollowed connection sleeve adapted to receive an end of the spindle of the bottom bracket when the bottom bracket tool is engaged to the bottom bracket, the connector portion defining a coupling of the bottom bracket tool, the coupling including splines adapted to engage a correspondingly shaped coupling portion of the bottom bracket assembly.

In accordance with a third aspect, there is provided a bottom bracket tool for a bottom bracket assembly, the bottom bracket tool comprising: a rim body having a plurality of teeth defined at an outer periphery thereof, the teeth configured for cooperating with a chain of a chain whip tool; and a connector portion including a coupling defined in a side surface of the rim body, the coupling defining a receptacle having a pair of opposite spaced apart walls, the walls adapted to engage corresponding flat surfaces of a flanged cup of the bottom bracket assembly.

In accordance with a fourth aspect, there is provided a kit comprising a bottom bracket tool as disclosed and a chain whip tool. The kit may comprise more than one bottom bracket tool.

In accordance with a fifth aspect, there is provided a tool kit for removing a bottom bracket assembly from a bicycle frame, the tool kit comprising at least one bottom bracket tool as disclosed, and a mounting axle insertable inside an emptied bottom bracket shell of the bottom bracket assembly, the mounting axle having an end axially securable to the bottom bracket tool via a fastener for axial retention of the bottom bracket tool on the coupling portion of the bottom bracket assembly.

In accordance with a sixth aspect, there is provided a method of removing a bottom bracket assembly from a bicycle frame, the method comprising: registering correspondingly shaped coupling portions of the bottom bracket assembly and a bottom bracket tool, mounting a chain whip tool on teeth defined at an outer periphery of a rim body of the bottom bracket tool, and generating a torque on the bottom bracket tool mounted to the bottom bracket assembly via the chain whip tool.

Further in accordance with the sixth aspect, registering the coupling portions of the bottom bracket assembly and of the bottom bracket tool includes placing the rim body of the bottom bracket tool relative to an end face of a bottom bracket cartridge or of a flanged cup of the bottom bracket assembly such that a distance between the end face and an axial plane of the rim body coplanar with the teeth is 1/8±1/16 inch, for example.

DESCRIPTION OF THE DRAWINGS

Reference is now made to the accompanying figures in which:

FIG. 5 is a perspective view of the bottom bracket tool of FIGS. 3A and 3B shown in engagement with a chain whip tool;

DETAILED DESCRIPTION

Figure 1:
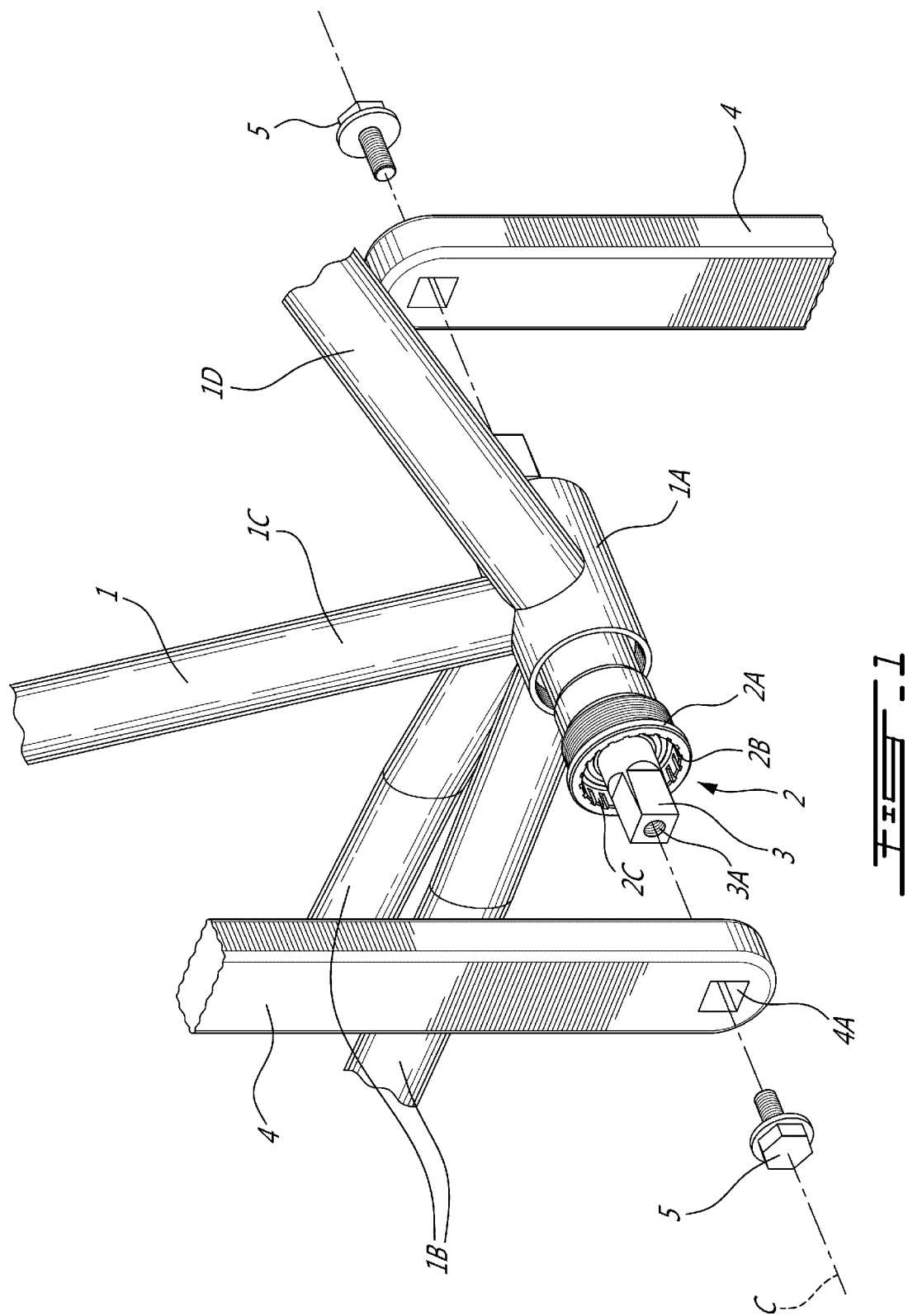
FIG. 1 is a perspective, partially exploded, view of part of a bicycle frame, showing an example of a bottom bracket assembly mounted to the bicycle frame and cranks mountable to the bottom bracket assembly.
Figure 2:
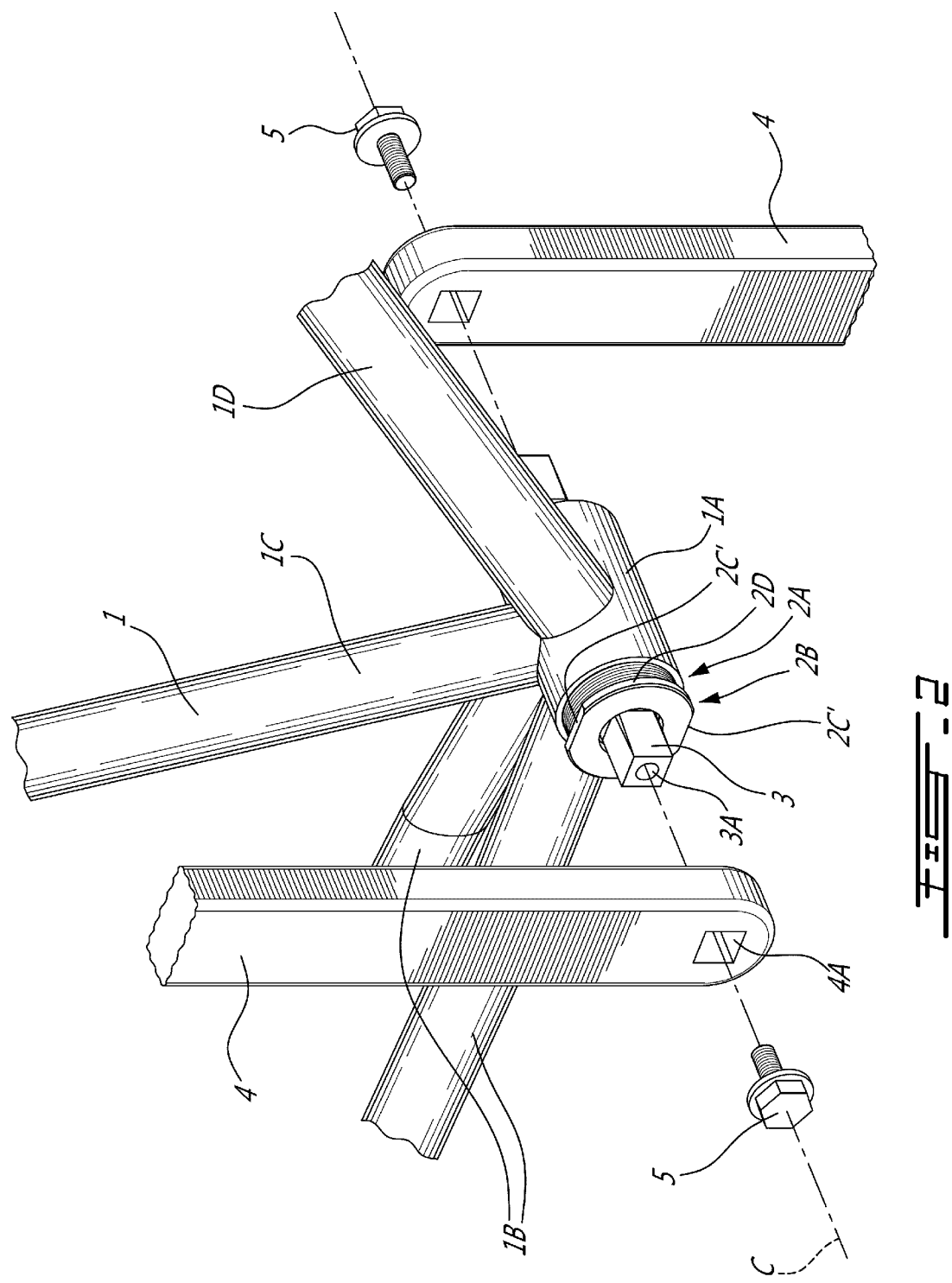
FIG. 2 is a perspective, partially exploded, view of part of the bicycle frame of FIG. 1, showing another example of a bottom bracket assembly mounted to the bicycle frame and cranks mountable to the bottom bracket assembly.

Referring to FIGS. 1 and 2, there is shown a bicycle frame 1 having a bottom bracket assembly 2 mounted thereto, in a bottom bracket shell 1A, also known as bottom bracket tube. The bottom bracket shell 1A is shown as an open-ended tube, such as a metal tube, but may have other configurations. For example, the bottom bracket shell 1A may be a monoblock component of composite material, and may include a metallic tube therein to accommodate the bottom bracket assembly 2. This is one embodiment among others. The bottom bracket shell 1A is at a junction between the chain stays 1B, the seat tube 1C, and the down tube 1D.

The bottom bracket assembly 2 has a spindle 3 (also known as an axle) extending from the bottom bracket shell 1A and configured to connect with receiving female portion 4A of cranks 4. In the depicted embodiment, the spindle 3 has opposite ends having a generally square cross-section configured to engage with a corresponding square cross-section female receiving portion 4A of the cranks 4. Threaded holes 3A are defined at the opposite ends of the spindle 3. Other geometries and/or types of cranks 4 to bottom bracket assembly 2 engagement may be contemplated, such as respective splined male and female interconnecting portions on the spindle 3 and the cranks 4, for instance.

The cranks 4 are secured to the spindle 3 of the bottom bracket assembly 2. In the depicted embodiment, the cranks 4 and the bottom bracket assembly 2 are secured via fasteners 5 attached to the hole 3A at an end of the spindle 3 such as to axially fix the cranks 4 along axis C of the spindle 3 when the cranks 4 are mounted to the bottom bracket assembly 2. The cranks 4 may be secured to the spindle 3 in other suitable ways, so long as the cranks 4 are properly secured to the bottom bracket assembly 2 to impart rotation of the bottom bracket assembly 2 when torque is applied on the pedals (not shown) mounted at a distal end (not shown) of the cranks 4.

In an embodiment, the bottom bracket assembly 2 comprises a bottom bracket cartridge 2A, with a coupling portion 2B defined at least at one end of the bottom bracket cartridge 2A. The bottom bracket cartridge 2A may for instance be a tube enclosing bearings that rotatably support the spindle 3. The bottom bracket cartridge 2A may be a sealed unit including bearings and the spindle 3. The coupling portion 2B may be integrally formed into an inner annular surface of the bottom bracket cartridge 2A, with an outer annular surface of the bottom bracket cartridge 2A being threaded for screwed engagement with corresponding threads in the bottom bracket shell 1A (or equivalent). In some cases, such coupling portion 2B may be in the form of a threaded cup integral with the bottom bracket cartridge 2A, such as to form a unitary piece therewith. Other types of bottom bracket assemblies 2 may include, for instance, an unthreaded bottom bracket cartridge 2A enclosing bearings that rotatably support the spindle 3, with mounting rings, in the form of a lockring or threaded cup for screwed engagement with corresponding threads in the bottom bracket shell 1A (or equivalent), and configured to be in "press-on" engagement with the periphery of bottom bracket cartridge 2A to support the bottom bracket cartridge 2A in the bottom bracket shell 1A. In other cases, the bottom bracket assembly 2 may be of the outboard bearing assemblies type, with bearings supported outside the ends of the bottom bracket shell 1A via mounting rings or cups, which define coupling portion(s) 2B in the form of splines at an outer periphery thereof, for instance. As a possibility, the bottom bracket cartridge 2A may take the form of an axle rotatably supported by the mounting rings or cups (with bearings interfacing therebetween, for instance) and in driving engagement with cranks 4. Other geometries or types of coupling portion 2B may exist depending on the bottom bracket assembly 2.

The insertion and/or removal of the bottom bracket cartridge 2A from the bottom bracket shell 1A may be achieved via the coupling portion 2B. Such coupling portion 2B may be accessible from an exterior of the bottom bracket shell 1A and are to be used in collaboration with a corresponding coupling of a bottom bracket tool, as described later with reference to FIGS. 3 to 7. In the depicted embodiment of FIG. 1, the coupling portion 2B of the bottom bracket assembly 2 defines splines 2C, which may have different patterns depending on the manufacturer, formed in an inner peripheral section of the bottom bracket cartridge 2A of the bottom bracket assembly 2, at an end thereof. In the depicted embodiment of FIG. 2, the coupling portion 2B of the bottom bracket assembly 2 is in the form of a threaded cup, for screwed engagement with corresponding threads in the bottom bracket shell 1A, having a flange 2D for axial engagement with an end of the bottom bracket shell 1A, with the coupling portion 2B in the form of wrench flats 2C' (or simply flats 2C') at an outer periphery of the flange 2D. In other words, the coupling portion 2B defines flat faces disposed axisymmetrically about the central axis C of the bottom bracket assembly 2 at an outer periphery of the flange 2D.

The bottom bracket assembly 2 may be mounted to the bicycle frame 1 in many suitable ways. As described above, bottom bracket assemblies (or part thereof) may be threaded peripherally along at least an axial length from an end of the bottom bracket assembly 2, such as to be screwed into the bottom bracket shell 1A or equivalent component of the bicycle frame 1, for instance. It may be desirable to remove the bottom bracket assembly 2 from the bicycle frame 1, for instance where maintenance to the bicycle frame 1, bottom bracket shell 1A, and/or the bottom bracket assembly 2 is required. During such operation of removing the bottom bracket assembly 2 from the bottom bracket shell 1A, tools may be used to unscrew the bottom bracket assembly 2 from the bottom bracket shell 1A.

Referring to FIGS. 3A, 3B, 4A, 4B, various embodiments of a bottom bracket tool 10 are shown. In an embodiment, the bottom bracket tool 10 is formed of the sides of FIGS. 3A and 3B, but the bottom bracket tool 10 may be formed of the sides of FIGS. 4A and 4B as another possibility.

Figure 3A:
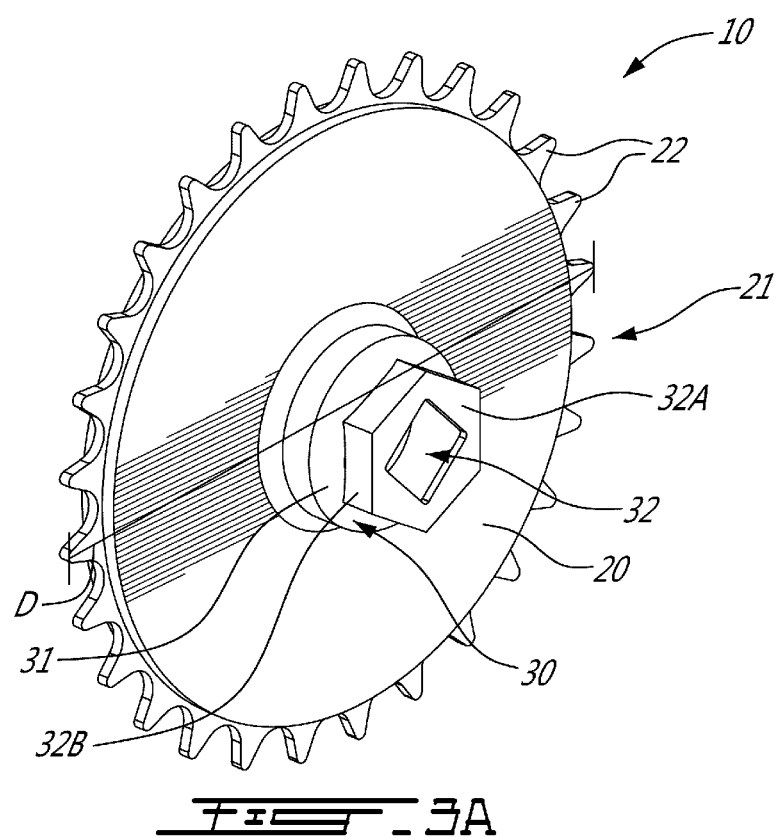
FIG. 3A is a perspective view of a first side of a bottom bracket tool for use with the bottom bracket assembly of FIG. 1, according to an embodiment.
Figure 3B:
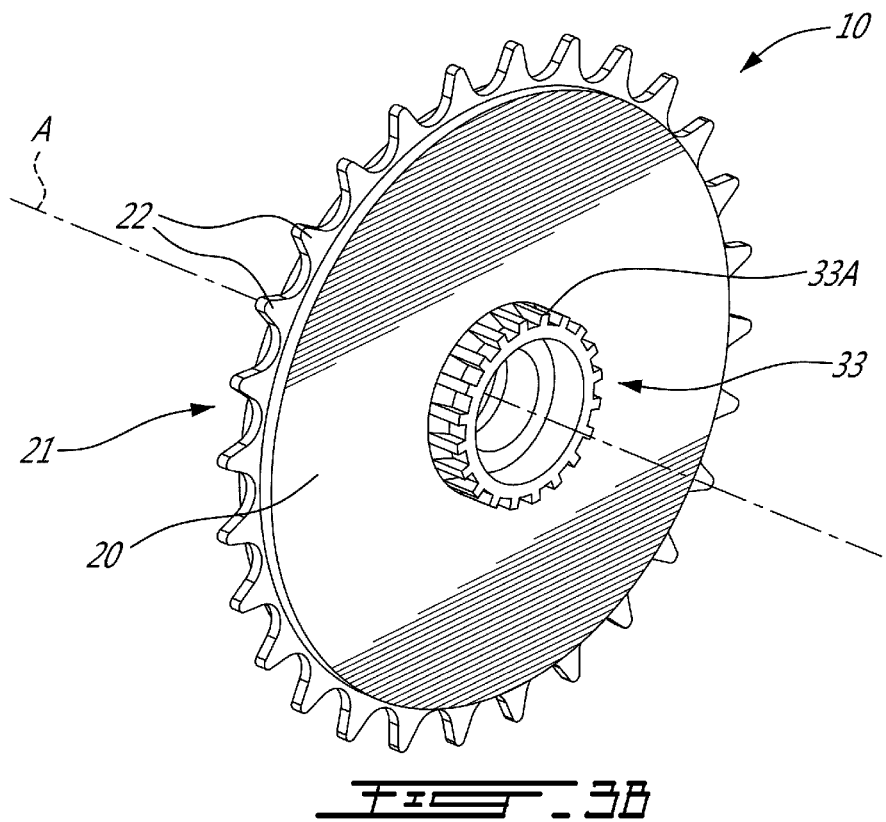
FIG. 3B is a perspective view of a second side of the bottom bracket tool of FIG. 3A, according to an embodiment.

In the embodiment of FIGS. 3A and 3B, the bottom bracket tool 10 comprises a rim body 20, such as a disc or disk, and a connector portion 30, also known as a hub. In the embodiment shown, the connector portion 30 is connected to the rim body 20 and extends along a longitudinal axis A of the bottom bracket tool 10. The rim body 20 and the connector portion 30 may be made as one integral part, such as cast as a monoblock piece, machined in one piece, forged, or otherwise formed as a single piece. As another possibility, the rim body 20 and the connector portion 30 may be separate parts permanently assembled or joined together, such as by welding or by brazing for instance. The rim body 20 and the connector portion 30 may be separate parts, meaning that they can be removably connected to one another, such as, for instance, via fasteners and/or mechanical interlock. Moreover, as explained below, a fastener, such as fastener 5, may hold the rim body 20 and the connector portion 30 assembled to the spindle 3 during use, even though the rim body 20 and the connector portion 30 may be separate parts.

In the depicted embodiment, the rim body 20 is a flat plate, with such flat plate in the form of a disc having flat surfaces defined on its opposite sides thereof. In the depicted embodiment, the rim body 20 and the connector portion 30 are concentrically connected to one another, though they may be eccentric as well. As shown, the connector portion 30 defines a central hub extending coaxially along the longitudinal axis A of the bottom bracket tool 10. The rim body 20 extends generally radially from the connector portion 30. In some embodiments, such the depicted ones, a vector of the longitudinal axis A is normal to a plane of the rim body 20. The connector portion 30 may not extend coaxially along the longitudinal axis A of the bottom bracket tool 10 in other embodiments, such that the connector portion 30 may be offset from the longitudinal axis A of the bottom bracket tool 10.

Figure 4A:
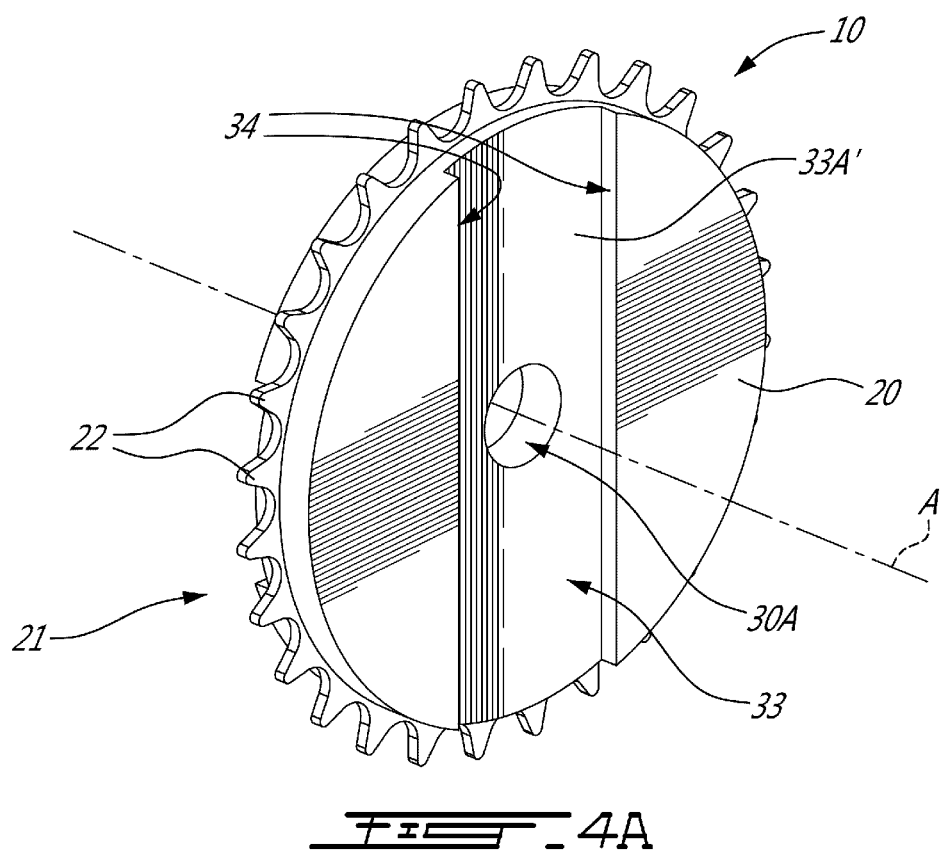
FIG. 4A is a perspective view of a first side of a bottom bracket tool for use with the bottom bracket assembly of FIG. 2, according to an embodiment.
Figure 4B:
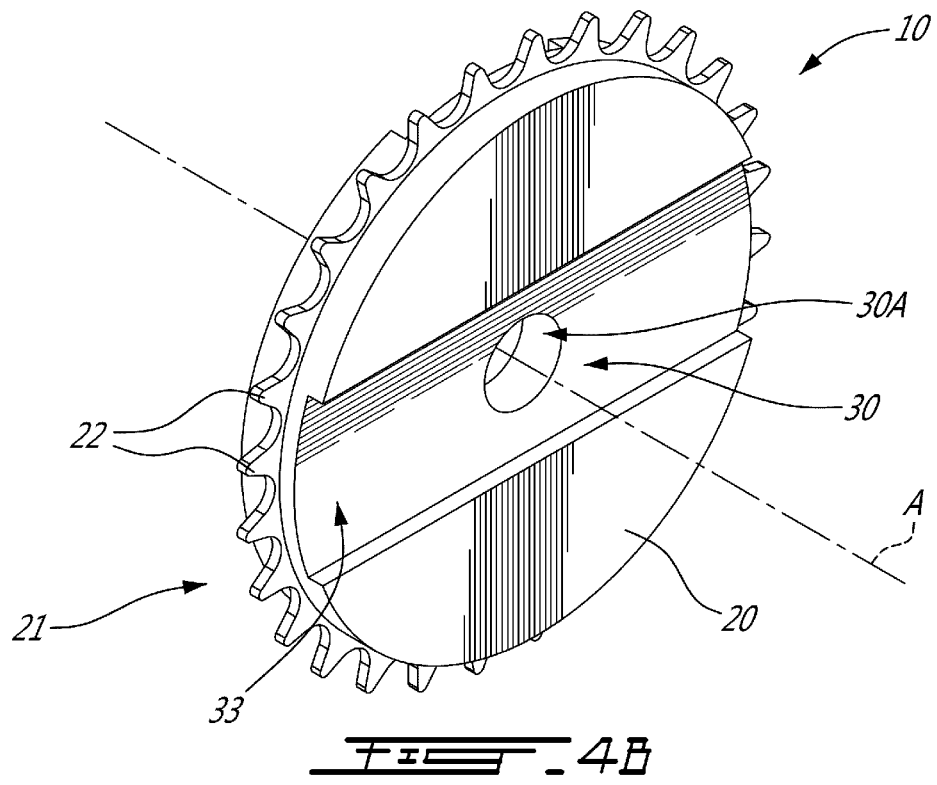
FIG. 4B is a perspective view of a second side of the bottom bracket tool of FIG. 4A, according to an embodiment.

In the embodiment of FIGS. 4A and 4B, the bottom bracket tool 10 comprise a rim body 20 similar to that of the embodiment shown in FIGS. 3A and 3B, and so the similar features will not be repeated. In this embodiment, the connector portion 30 is in the form of a through hole 30A concentric with the longitudinal axis A of the bottom bracket tool 10.

While the rim body 20 defines a plain disc in the embodiments shown and described, the rim body 20 may have different configurations as a well. According to one possibility, the rim body 20 is defined by a plurality of spokes extending radially from the connector portion 30, or extending radially from a central part of the rim body 20. In other words, the rim body 20 may not be a solid disc, with the rim body 20 defining recesses or voids (voids or holes) to reduce weight of the bottom bracket tool 10, for instance. In the depicted embodiment, the rim body 20 is in the form of a round disc, even though oval, hemispherical or other suitable shape may be contemplated. Regardless of the shape of the rim body 20, the rim body 20 may extend radially from the connector portion 30, as mentioned above.

The rim body 20 defines a chain ring 21 at an outer periphery thereof. The chain ring 21 may be integrally connected to the disc or spokes, for example in a monoblock configuration. The chain ring 21 includes a plurality of teeth 22 defined at an outer periphery thereof. In the depicted embodiments, the teeth 22 are shaped as sprocket teeth or cogs of gears or chain rings of bicycles. The teeth 22 may be provided on the full circumference of the chain ring 21, or on parts thereof only. The teeth 22 are adapted to be used with a chain of a chain whip tool. This aspect is described with reference to FIGS. 5 to 7 later. While the teeth 22 are shaped as sprocket teeth in the depicted embodiment, the teeth 22 may be shaped differently in other embodiments, so long the teeth 22 may suitably be used with a chain whip tool.

The rim body 20 has a maximum dimension transverse to axis A, or along an axial plane of the rim body 20 coplanar with the teeth 22. Such maximum dimension is a maximum diameter D in embodiments where the geometry or shape of the rim body 20 is rounded (round or oval disc, for instance). Such maximal dimension may be contemplated in order to prevent interference between the outermost periphery of the bottom bracket tool 10 and the bicycle frame 1, such as the chain stays 1B of the bicycle frame 1 when a user of the bottom bracket tool 10 operates it to install or remove the bottom bracket assembly 2, as discussed later. In an embodiment, such maximal diameter may be 4.5 inches (+2/−1 inches), although other suitable dimensions may be contemplated in other embodiments. On the one hand it may be desired to have a large maximum diameter D to procure a greater leveraging torque, but without having an interference with surrounding parts of the frame 1. During use, the rim body 20 will essentially be located at the location of a chain ring of a crank set, whereby the maximum diameter D may be at least as large as the largest possible chain ring of the crank set that is the closest to the bicycle frame 1.

In the depicted embodiment of FIGS. 3A and 3B, the connector portion 30 includes a connection sleeve or hub 31. The connection sleeve 31 is hollowed to receive an end of the spindle 3 of the bottom bracket assembly 2 when the bottom bracket tool 10 is engaged to the bottom bracket assembly 2. In an embodiment, the connection sleeve 31 has an inner cavity to receive the free end of the spindle 3. Although not shown, the inner cavity of the connection sleeve 31 may have a geometry corresponding to the cross-section of the spindle 3, or at least some flats to lie against the spindle 3 and hence force concurrent rotation. In the depicted embodiment, the connection sleeve 31 defines a hole 32 at an axial end of the connector portion 30, surrounded by an abutment surface 32A. The hole 32 is configured for a fastener, such as the fastener 5 mentioned above, to reach the spindle 3 and be screwed/secured into the threaded hole 3A. As such, when the bottom bracket tool 10 is engaged to the bottom bracket assembly 2, the fastener 5 may be fastened to an end of the spindle 3 to hold axially the bottom bracket tool 10 against the bottom bracket assembly 2. For this purpose, the axial length L of the connection sleeve 31 is selected as a function of the projecting length of the spindle 3 beyond the bottom bracket cartridge 2A. In an embodiment, when the bottom bracket tool 10 is installed over the spindle 3, the tip of the spindle 3 is within the connection sleeve 31, with the fastener 5 bridging the gap between the end of the spindle 3 and the abutment surface 32A. The fastener 5 abuts against the abutment surface 32A and entrains the bottom bracket tool 10 in position with the bottom bracket assembly 2 when screwed into the threaded hole 3A. This may assist in forming a robust assembly of the bottom bracket tool 10 to the bottom bracket assembly 2 for removal and/or installation of the bottom bracket assembly 2 from/onto the bicycle frame 1, to allow high manual leveraged torque to be applied, and/or avoid misalignment between the longitudinal axis A of the bottom bracket tool 10 and axis C of the spindle 3 when torquing. There may have other embodiments of the connection sleeve 31 that do not allow axial retention of the bottom bracket tool 10 on the bottom bracket assembly 2, other than by applying an axial force on the bottom bracket tool 10 against the bottom bracket assembly 2, by the user of the bottom bracket tool 10 during installation and/or removal of the bottom bracket assembly 2, for instance, although this may be less desirable. For instance, in some embodiments, the connection sleeve 31 may form a closed end or may not have a hole 32 allowing engagement of a fastener.

In some embodiments, such as shown in FIG. 3A, the connection sleeve 31 may include an hexagonal portion 32B or flat surfaces at the periphery thereof, such that a tool (e.g. wrench, spanner, plier, gripper, clamp, etc.) may interface therewith to hold the bottom bracket tool 10. Other configurations or geometries may be contemplated for the connection sleeve 31. The connection sleeve 31 may also be absent in other embodiments, where holding the bottom bracket tool 10 on the bottom bracket assembly 2 may not be required, or made differently, for instance.

As shown in FIG. 3B, the connector portion 30 defines a coupling 33 of the bottom bracket tool 10. The coupling 33 may or may not be part of the connection sleeve 31. In any event, the length L of the connection sleeve 31 takes into account the length of the coupling 33. Such coupling 33 of the bottom bracket tool 10 is adapted to engage a correspondingly shaped coupling portion 2B of the bottom bracket assembly 2. The coupling 33 may thus have different configurations, depending on the embodiments, to have bottom bracket tools 10 adapted for different types of bottom bracket assemblies 2, more particularly different types or geometries of coupling portions 2B of bottom bracket assemblies 2, some of which explained above. In the depicted embodiment, the coupling 33 includes splines 33A defined in an outer periphery thereof. The splines 33A extends from an axial end face of the coupling 33. The splines 33A may register with corresponding splines (or simply "coupling portion 2B") of the bottom bracket assembly 2. The connector portion 30 defines an opening at the axial end face thereof to allow receiving the spindle 3 of the bottom bracket assembly 2 when the bottom bracket tool 10 is mounted to the bottom bracket assembly 2.

Referring to FIGS. 4A and 4B, there is shown an alternate embodiment of the coupling 33 of the bottom bracket tool 10. In the depicted embodiment, the coupling 33 is defined in a side surface of the rim body 20. In the embodiment shown, the bottom bracket tool 10 of FIGS. 4A and 4B have two couplings 33, i.e. one defined in each side surface of the rim body 20. There may be a coupling 33 only on a single side surface of the rim body 20 in other embodiments. The coupling 33 defines a receptacle such as a channel 33A' having a pair of opposite spaced apart walls 34. In an embodiment, the opposite walls 34 face one another at a distance of 1⅜±1/16 inch. Such distance may correspond to the distance taken between the flats 2C' of the flange 2D (FIG. 2). Since a bottom bracket tool 10 may be adapted for a particular type of bottom bracket assembly 2, other distances between the opposite walls 34 of the channel(s) 33A' may be contemplated, where the distance between the flat faces (or flats 2C') of a threaded cup (with flange 2D) of a type of bottom bracket assembly 2 may differ by models. It may be desirable to have the rim body 20 with a different coupling 33 on each side surface, such as shown in FIGS. 4A and 4B, for instance, where each of the couplings 33 may be adapted to fit with a different coupling portion 2B of a particular bottom bracket assembly model. For instance, there may be channels 33A' on both side surfaces of the rim body 20 adapted to fit different models of flanged cup with flats 2C'. Other pairing of couplings 33 may be contemplated in other embodiments, such as combining couplings 33 of FIG. 3B and FIGS. 4A/4B, for instance. While in the depicted embodiment the channel(s) 33A' extends along a substantial portion of the maximum diameter D of the rim body 10, such geometry of the coupling 33 may be different, such as a square hole or squircle hole, etc.

The coupling 33 may have other suitable shapes and/or configurations as a function of other types of coupling portions 2B of bottom bracket assemblies 2, such as, for instance, notches or splines defined in an outer periphery of the bottom bracket cartridge 2A, for instance. While in the embodiments presented herein the coupling 33 crosses or coextends with the longitudinal axis A of the bottom bracket tool 10, other configurations of the bottom bracket tool 10 may be envisioned. As mentioned previously, it is contemplated to have a bottom bracket tool 10 that combines the couplings 33 of FIGS. 3B and 4A/4B, among others, for the bottom bracket tool 10 to have some universality. However, in such an embodiment, the bottom bracket tool 10 may not have a sufficient length L to allow the fastener 5 to abut against an abutment surface 32A. Accordingly, the bottom bracket tool 10 may be provided with a separate connection sleeve 31 or like spacer that would cover the spindle 3 and serve as abutment for the fastener 5 when screwed in the threaded hole 3A of the spindle 3.

Figure 6:
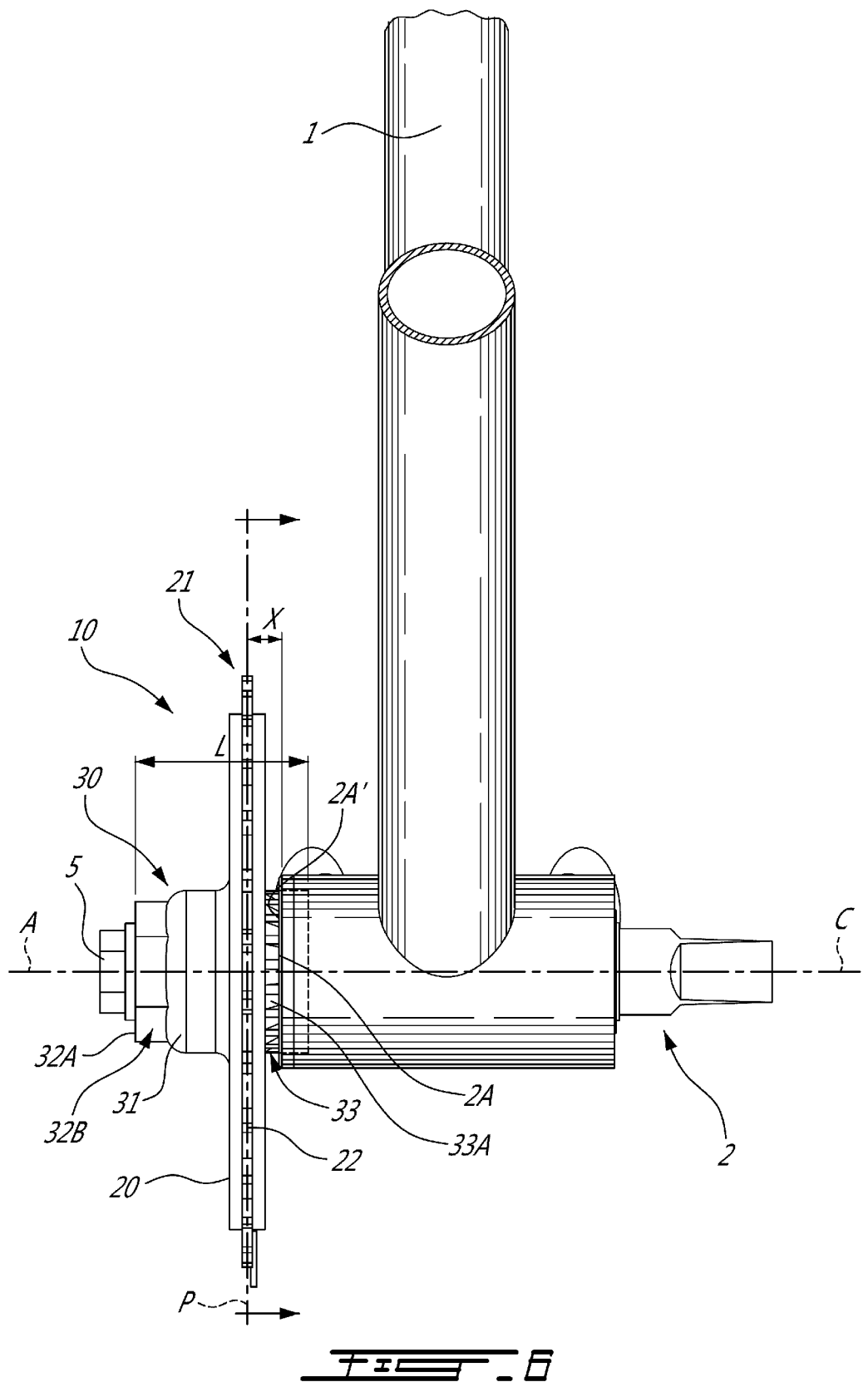
FIG. 6 is an elevation view of the bicycle frame shown in FIG. 1, with the exemplary bottom bracket tool of FIGS. 3A and 3B in engagement with the bottom bracket assembly of FIG. 1.

Referring to FIGS. 5 and 6, the bottom bracket tool 10, for instance one having the coupling 33 of FIG. 3B, with the connection sleeve 31 of FIG. 3A, is shown mounted to the bottom bracket assembly 2, during operation for installation and/or removal of the bottom bracket assembly 2 from the bicycle frame 1. The bottom bracket tool 10 is mounted to the bottom bracket assembly 2 such that their respective coupling portions 2B, 33 register with each other, e.g., mate, couple, connect. Optionally, the bottom bracket tool 10 is axially held onto the bottom bracket assembly 2 via the fastener 5 screwed into the threaded hole 3A of the spindle 3 of the bottom bracket assembly 2. In an embodiment, the fastener 5 rigidly connects the bottom bracket tool 10 to the bottom bracket assembly 2, to remove any out-of-plane play. This may be achieved by the pressure applied by the fastener 5 due to the selected length L and resulting gap described above. As shown in FIG. 5, a chain whip tool CWT is mounted on the teeth 22 of the rim body 20. A user of the chain whip tool CWT in conjunction with the bottom bracket tool 10 may thus exert a force on the chain whip tool arm to apply torque on the bottom bracket tool 10 and in turn to the bottom bracket assembly 2 (or bottom bracket cartridge 2A thereof) engaged therewith. The torque generated may thus allow the user to screw or unscrew the bottom bracket assembly 2 (or bottom bracket cartridge 2A thereof) to the bottom bracket shell 1A of the bicycle frame 1. The presence of the fastener 5 to axially hold the bottom bracket tool 10 onto the bottom bracket assembly 2 (or part thereof) may facilitate this operation, since the user may not have to hold the bottom bracket tool 10 against the bottom bracket assembly 2 while applying torque.

Whether or not the bottom bracket tool 10 is axially securable to the bottom bracket assembly 2, as discussed above, an axial distance X between the end face 2A' of the bottom bracket cartridge 2A (or end face of the flanged cup of the bottom bracket assembly, in embodiments where this is applicable) of the bottom bracket assembly 2 and a plane of application of the load may be desirably minimized to prevent or reduce the risk of damaging the bottom bracket assembly 2 and/or the bicycle frame 1 due to high load concentration during torquing. For instance, misalignment between a bottom bracket tool and the bottom bracket assembly 2 may increase such load concentration and damage the bottom bracket assembly 2 and/or simply render the installation or removal of the bottom bracket assembly 2 more challenging (for instance, due to tool-to-bottom bracket assembly 2 slippage, or strippage of the coupling portion 2B of the bottom bracket assembly 2 that may occur during installation). In an embodiment, the bottom bracket tool 10 is configured such that the distance X between the end face 2A' of the bottom bracket cartridge 2A of the bottom bracket assembly 2 and the point of application of the load on the rim body 20 is $\frac{1}{8} \pm \frac{1}{16}$ inch. Such distance X may be taken between the end face 2A' of the bottom bracket cartridge 2A and an axial plane P of the rim body 20, where the axial plane P and the teeth 22 are coplanar. In an embodiment, such distance X may be even less, or even null, where the rim body 20 is shaped to allow this (and concurrently the geometry of the bicycle frame 1 allows it) while not interfering with the bicycle frame 1 when the bottom bracket assembly 2 is in the bicycle frame 1. In some embodiments, the connector portion 30 or coupling 33 may be dimensioned (e.g. have an axial length relative to the rim body 20) such that a distance between an axial end face of the connector portion 30 (or coupling 33) of the bottom bracket tool 10 and the axial plane P of the rim body 20 may be minimized. For instance, in some cases, the distance between an axial end face of the connector portion 30 (or coupling 33) of the bottom bracket tool 10 and the axial plane P of the rim body 20 is less than $\frac{1}{2} \pm \frac{1}{16}$ inch, or less $\frac{1}{4} \pm \frac{1}{16}$ inch, for instance $\frac{1}{8} \pm \frac{1}{16}$ inch in some particular cases, and in some other particular cases even less.

Figure 7:
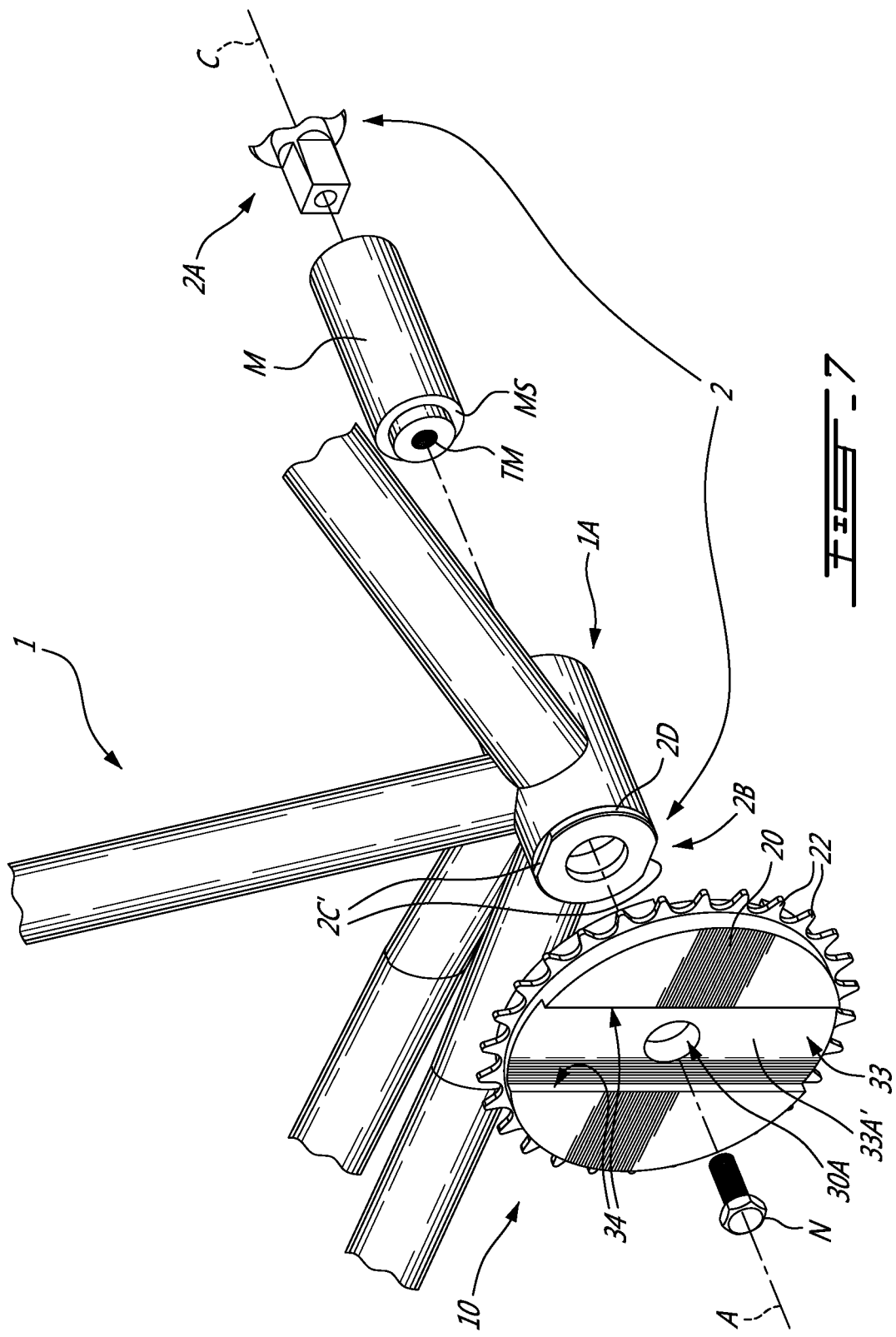
FIG. 7 is a perspective, partially exploded, view of the exemplary bottom bracket tool of FIGS. 4A and 4B shown in engagement with a part of the bottom bracket assembly of FIG. 2.

Referring to FIG. 7, the exemplary bottom bracket tool 10 of FIGS. 4A and 4B is shown (exploded) about to be mounted to the exemplary bottom bracket assembly 2 of FIG. 2, during operation for installation and/or removal of the bottom bracket assembly 2 from the bicycle frame 1. Components (for instance bottom bracket cartridge 2A, bearings, spindle, and/or equivalent, such as a spindle with a loose ball bearing or ball bearing in a cage) of the bottom bracket assembly 2 may have been removed from the bottom bracket shell 1A before mounting the bottom bracket tool 10 onto the threaded cup (coupling portion 2B) with flange 2D (also shown in FIG. 2). As such, the bottom bracket tool 10 may be mounted onto the flange 2D, with the walls 34 of the channel 33A' interfacing with the flats 2C'. Then, the bottom bracket tool 10 may be axially secured in this position. As shown in FIG. 7, the bottom bracket tool 10 may be axially secured to the coupling portion 2B via a mounting axle M (or "coupling rod"). The axle M is shaped as an elongated rod. In the embodiment shown, the axle has a round cross-section, though other shapes may be contemplated, such as square, pentagonal, hexagonal, or other shapes. The axle M is sized to fit inside the emptied bottom bracket shell 1A. The axle M may thus be inserted inside the emptied bottom bracket shell 1A and secured to the bottom bracket tool 10 at an end of the axle M, for instance via fastener(s). The axle M defines an anchor point for axial retention of the bottom bracket tool 10 on the coupling portion 2B, with the axle M and the bottom bracket tool 10 disposed on opposite sides of the coupling portion 2B. In other words, the coupling portion 2B may be sandwiched (sandwiched and/or clamped) axially between the bottom bracket tool 10 and the axle M once the bottom bracket tool 10 is installed on the coupling portion 2B and secured thereto by axial connection with the axle M.

In the embodiment shown, the axle M has a shoulder MS defined at an end thereof. The axle M has an end section extending axially along part of a length of the axle M from that end. The shoulder MS is defined by the cross-section differential (and/or diameter differential if the cross-section is rounded) between the end section of the axle M and an adjacent section of the axle M. In other words, the axle M has a smaller transverse dimension at the end section thereof than adjacent such end section. The shoulder MS defines a radial surface extending circumferentially about an axis of the axle M. The radial surface extends radially between the end section and an outer periphery of the axle, adjacent thereof. The radial surface may abut axially against an end of the coupling portion 2B. During installation of the bottom bracket tool 10, the axle M may be inserted inside the emptied bottom bracket shell 1A until the radial surface of the shoulder MS contacts the end of the coupling portion 2B. In this position, the end section of the axle may be received in a female portion (the "cup side" of the coupling portion 2B in the form of a threaded cup, for instance).

In the embodiment shown, the axle M has threads defined at an end thereof, to receive complementary threads of a fastener B, such as a threaded bolt. As shown, a threaded hole TM is defined at the end of the axle M. During installation of the bottom bracket tool 10, once the bottom bracket tool 10 is mounted onto the flange 2D of the coupling portion 2B and the axle M axially received within the bottom bracket shell 1A to abut against the coupling portion 2B on the opposite side of the coupling portion 2B from the bottom bracket tool 10, the fastener B, here threaded bolt, may engage the threaded hole of the axle M until axial retention of the bottom bracket tool 10 on the coupling portion 2B is achieved. Once axially secured to the axle M, the bottom bracket tool 10 may be mounted on the coupling portion 2B, thereby retaining axially the bottom bracket tool 10 thereon.

In other embodiments, the axle M may have a threaded end or define a threaded rod portion, instead of the threaded hole TM described above, which could extend through the through hole 30A of the rim body 20 when the axle M is received inside the emptied bottom bracket shell 1A, and screwed via a nut (not shown) abutting the rim body 20 to hold axially the bottom bracket 10 in place.

The axle M may be considered part of the bottom bracket tool 10, or the bottom bracket tool 10 and the axle M may be considered as part of a bottom bracket tool assembly (and/or part of a kit comprising the bottom bracket tool 10), as another possibility.

In other embodiments, the bottom bracket tool 10 may be secured axially to the coupling portion 2B in other suitable ways, for instance via a fastener, for example a bolt inserted inside the emptied bottom bracket shell 1A, through the through hole 30A of the rim body 20, and screwed via a nut abutting on the rim body 20 to hold axially the bottom bracket tool 10 in place.

While securing axially the bottom bracket tool 10 on the coupling portion 2B as discussed above may facilitate the operation of the bottom bracket tool 10 in use, this may not be necessary.

Whether or not the bottom bracket tool 10 is axially secured on the coupling portion 2B, a chain whip tool CWT (such as shown in FIG. 5, for instance) may be engaged with the teeth 22 of the rim body 20 and used to generate torque on the coupling portion 2B (here threaded cup with flange 2D), as discussed similarly above with respect to another embodiment.

While the exemplary bottom bracket tool 10 of FIGS. 4A and 4B is shown in FIG. 7, a variant of the bottom bracket tool 10 with one side as shown in FIG. 4A or 4B and another side with a connection sleeve 31 such as discussed above (for instance as shown in FIG. 3A) may be contemplated, although not specifically shown. Such bottom bracket tool 10 would be mountable onto the threaded cup with flange 2D as discussed above with respect to FIG. 7, and axially securable in this position as discussed above with respect to FIGS. 5 and 6, in cases where the types or model(s) of bottom bracket assembly 2 permit such mounting/securing.

The bottom bracket tools 10 as disclosed herein may be provided and/or sold in a kit comprising a chain whip tool and the bottom bracket tool(s) 10, and other optional components such as separate connection sleeve 31, fastener 5 with or without integrated flange or washer, if required. The bottom bracket tool 10 may also be used with a chain whip tool provided and/or sold separately. Bottom bracket tools 10 such as disclosed may also be provided and/or sold in a kit comprising more than one bottom bracket tool 10, with different configurations to allow for removal and/or installation of different types of bottom bracket assemblies 2 having different geometries of coupling portions 2B.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A bottom bracket tool for removal of a bottom bracket assembly from a bicycle frame, the bottom bracket assembly securable to a bottom bracket shell of the bicycle frame, the bottom bracket tool comprising:
   a rim body having a plurality of teeth defined at an outer periphery thereof, the teeth configured for engaging with a chain of a chain whip tool; and
   a connector portion connected to or forming part of the rim body, the connector portion including a coupling of the bottom bracket tool, the coupling adapted to engage a correspondingly shaped coupling portion of the bottom bracket assembly screwed to the bottom bracket shell of the bicycle frame and, upon application of a torque on the rim body, unscrewing the correspondingly shaped coupling portion from the bottom bracket shell of the bicycle frame.

2. The bottom bracket tool as defined in claim 1, wherein a distance between an axial end face of the coupling adapted to face the correspondingly shaped coupling portion of the bottom bracket assembly and an axial plane of the rim body coplanar with the teeth is less than $\frac{1}{2} \pm \frac{1}{16}$ inch.

3. The bottom bracket tool as defined in claim 1, wherein the connector portion projects from at least one side of the rim body.

4. The bottom bracket tool as defined in claim 1, wherein the connector portion defines an opening at an axial end face thereof adapted to receive a spindle of the bottom bracket assembly when the bottom bracket tool is mounted to the bottom bracket assembly.

5. The bottom bracket tool as defined in claim 1, wherein the rim body and the connector portion are concentrically connected to one another along a common axis.

6. The bottom bracket tool as defined in claim 1, wherein the coupling is defined in a side surface of the rim body.

7. The bottom bracket tool as defined in claim 1, wherein the coupling includes splines.

8. The bottom bracket tool as defined in claim 7, wherein the splines are defined in an outer periphery of the coupling, the splines extending from an axial end face of the coupling.

9. The bottom bracket tool as defined in claim 1, wherein the coupling defines a receptacle having a pair of opposite spaced apart walls adapted to engage corresponding flat surfaces of a flanged cup of the bottom bracket assembly.

10. The bottom bracket tool as defined in claim 9, wherein the receptacle is a channel extending along a substantial portion of a maximum diameter of the rim body.

11. The bottom bracket tool as defined in claim 1, wherein the rim body defines a disc, the teeth defined on a full circumference of the disc.

12. The bottom bracket tool as defined in claim 1, wherein the rim body has a maximum dimension in an axial plane of the rim body coplanar with the teeth, the maximum dimension being 4.5 inches +2/−1 inches.

13. The bottom bracket tool as defined in claim 1, wherein the connector portion includes a hollowed connection sleeve adapted to receive an end of a spindle of the bottom bracket assembly when the bottom bracket tool is engaged to the bottom bracket assembly.

14. The bottom bracket tool as defined in claim 13, wherein the hollowed connection sleeve defines a hole at an axial end of the connector portion, surrounded by an abutment surface, the hole adapted to receive a fastener securable to the spindle.

15. The bottom bracket tool as defined in claim 13, wherein the hollowed connection sleeve includes flat surfaces at a periphery thereof.

16. The bottom bracket tool as defined in claim 13, wherein the hollowed connection sleeve has a hexagonal portion.

17. The bottom bracket tool as defined in claim 1, wherein the coupling is a first coupling of the bottom bracket tool on a first side of the rim body, the connector portion including a second coupling on a second opposite side of the rim body, the second coupling adapted to engage a second correspondingly shaped coupling portion of the bottom bracket assembly.

* * * * *